United States Patent
Takeuchi et al.

(10) Patent No.: US 8,326,247 B2
(45) Date of Patent: Dec. 4, 2012

(54) RECEIVER

(75) Inventors: Mitsuru Takeuchi, Tokyo (JP); Eiji Arita, Tokyo (JP)

(73) Assignee: Mitubishi Electric Corporation, Tokyo (JP)

( * ) Notice: Subject to any disclaimer, the term of this patent is extended or adjusted under 35 U.S.C. 154(b) by 54 days.

(21) Appl. No.: 13/131,666

(22) PCT Filed: Nov. 5, 2009

(86) PCT No.: PCT/JP2009/005877
§ 371 (c)(1),
(2), (4) Date: May 27, 2011

(87) PCT Pub. No.: WO2010/097865
PCT Pub. Date: Sep. 2, 2010

(65) Prior Publication Data
US 2011/0244822 A1    Oct. 6, 2011

(30) Foreign Application Priority Data

Feb. 25, 2009   (JP) .................................. 2009-042611

(51) Int. Cl.
*H03D 7/16* (2006.01)
(52) U.S. Cl. .................. 455/131; 455/234.1; 455/245.1; 455/132; 455/277.1; 375/260
(58) Field of Classification Search .................. 455/131, 455/234.1, 245.1, 132, 277.1; 375/260
See application file for complete search history.

(56) References Cited

U.S. PATENT DOCUMENTS

| | | | |
|---|---|---|---|
| 2004/0066736 A1* | 4/2004 | Kroeger | 370/200 |
| 2004/0242177 A1* | 12/2004 | Yang | 455/234.1 |
| 2009/0180035 A1* | 7/2009 | Muller et al. | 348/729 |
| 2012/0082255 A1* | 4/2012 | Anderson et al. | 375/260 |

FOREIGN PATENT DOCUMENTS

| | | |
|---|---|---|
| JP | 2001-103024 A | 4/2001 |
| JP | 2003-309776 A | 10/2003 |
| JP | 2005-252861 A | 9/2005 |
| JP | 2007-81878 A | 3/2007 |
| JP | 2007-312274 A | 11/2007 |

* cited by examiner

*Primary Examiner* — Sanh Phu
(74) *Attorney, Agent, or Firm* — Birch, Stewart, Kolasch & Birch, LLP

(57) ABSTRACT

A receiver 1 is comprised of a first frequency changing circuit 13 for converting a received signal including two or more broadcast waves into a first intermediate frequency signal with a local oscillation, a band separation filter 14 for allowing bands included in the two or more broadcast waves converted into the first intermediate frequency signal to pass therethrough simultaneously, and a second frequency changing circuit 15 for converting the received signal which is outputted by the band separation filter 14 and which is limited to the two or more broadcast waves into a second intermediate frequency signal from which each of the broadcast waves can be sampled at a frequency at which the broadcast waves do not interfere with one another.

4 Claims, 4 Drawing Sheets

(a)

(b)

RECEIVER

FIELD OF THE INVENTION

The present invention relates to a receiver capable of receiving multiple channels which simultaneously receives two or more broadcast waves which the receiver desires to receive.

BACKGROUND OF THE INVENTION

Many patent applications about a technology regarding a multichannel receiver that receives two or more broadcast waves simultaneously, for providing a receiver having a low-cost structure by sharing components among different models to reduce the component count have been applied.

For example, a multichannel receiver which has a frequency changing circuit for splitting one antenna input and then converting each broadcast wave which the multichannel receiver desires to receive into a signal having an intermediate frequency, and a band limiting filter, and which reduces its components, such as the antenna, by outputting one or more tuner outputs and performing signal demodulation on each of the one or more tuner outputs is known (for example, refer to patent reference 1).

Furthermore, a multichannel receiver which, in addition to the structure disclosed by patent reference 1, has a structure of combining extracted broadcast waves, which the multichannel receiver desires to receive, again and then outputting a plurality of channels via one output terminal to be able to further reduce the hardware of a next-stage signal demodulating unit is also known (refer to patent reference 2).

RELATED ART DOCUMENT

Patent Reference
Patent reference 1: JP,2003-309776,A
Patent reference 2: JP,2007-81878,A

SUMMARY OF THE INVENTION

However, the receiver according to any one of the technologies disclosed by above-mentioned patent references 1 and 2 require local oscillators and band limiting filters corresponding to several channels which need demodulation. Therefore, this requirement is an obstacle to further downsizing and cost reduction required.

The present invention is made in order to solve the above-mentioned problem, and it is therefore an object of the present invention to provide a receiver that makes it possible to carry out multichannel reception and can implement further downsizing and cost reduction thereof.

In order to solve the above-mentioned problem, a receiver in accordance with the present invention includes: a first frequency changing circuit for converting a received signal including two or more broadcast waves into a first intermediate frequency signal with a local oscillation; a band separation filter for allowing bands included in the two or more broadcast waves converted into the above-mentioned first intermediate frequency signal to pass therethrough simultaneously; and a second frequency changing circuit for converting the received signal which is outputted by the above-mentioned band separation filter and which is limited to the above-mentioned two or more broadcast waves into a second intermediate frequency signal from which each of the broadcast waves can be sampled at a frequency at which the broadcast waves do not interfere with one another, and the above-mentioned band separation filter is comprised of multiple delay circuits for delaying the above-mentioned received signal by a predetermined time, coefficient multiplying units each for multiplying an input or an output of a corresponding one of the above-mentioned delay circuits by a predetermined coefficient, and an adder for calculating a sum of outputs of the above-mentioned coefficient multiplying units.

Therefore, the receiver in accordance with the present invention makes it possible to carry out multichannel reception and can implement further downsizing and cost reduction thereof.

EMBODIMENTS OF THE INVENTION

Hereafter, in order to explain this invention in greater detail, the preferred embodiments of the present invention will be described with reference to the accompanying drawings.

Embodiment 1

Figure 1:
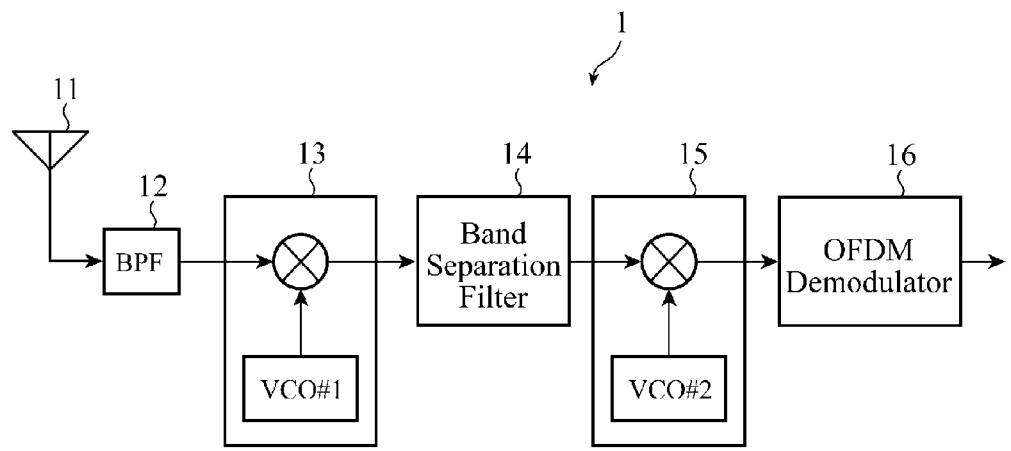
FIG. 1 is a block diagram showing the structure of a receiver in accordance with Embodiment 1 of the present invention.

FIG. 1 is a block diagram showing the structure of a receiver in accordance with Embodiment 1 of the present invention. In this figure, a front end which outputs two or more broadcast waves (channels) on which the receiver has performed multichannel reception to an OFDM demodulator 16 is extracted and shown.

As shown in FIG. 1, the receiver 1 in accordance with Embodiment 1 of the present invention is comprised of an antenna 11, a band limiting filter (BPF) 12, a first frequency changing circuit 13, a band separation filter 14, a second frequency changing circuit 15, and the OFDM (Orthogonal Frequency Division Multiplex) demodulator 16.

In the above-mentioned structure, a received signal inputted via the antenna 11 is limited to an entire broadcast wave band (for example, a UHF (Ultra High Frequency) band) by the BPF 12.

The received signal limited by this BPF is mixed with a signal having a local frequency generated by a voltage controlled oscillator VCO (Voltage Controlled Oscillator) #1 which constructs the first frequency changing circuit 13, and is then converted into a signal having a first intermediate frequency.

The first frequency changing circuit 13 carries out the frequency conversion by setting the local oscillating frequency fx of the VCO #1 to $\frac{1}{2}(f1+f2+fy)$, where a first broadcast wave has a frequency of f1, a second broadcast wave has a frequency of f2 and an offset frequency is expressed as fy.

For example, when f1 and f2 are set to satisfy f1>f2, and the frequency of the broadcast wave having the highest frequency among the broadcast waves which the receiver desires to receive is f1 and the frequency of the broadcast wave having the lowest frequency among the broadcast waves is f2, ½(f1+f2) becomes equal to the median one of the frequencies of the entire broadcast wave band which the receiver desires to receive. By adding the proper offset frequency fy to this median frequency, the first frequency changing circuit can convert the received signal into a signal having a proper intermediate frequency signal including all the broadcast waves which the receiver desires to receive.

The received radio waves whose frequencies have been converted into intermediate frequencies by the first frequency changing circuit 13 are inputted to the band separation filter 14.

Figure 2:
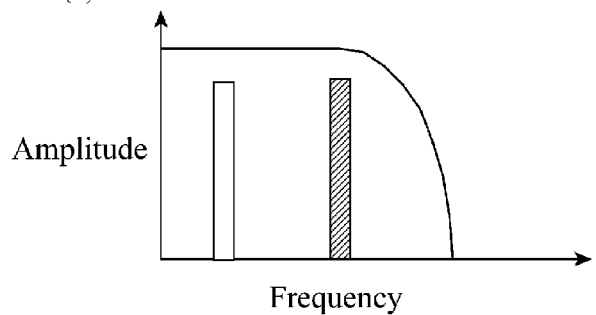
FIG. 2 is a view showing the frequency characteristic of a band separation filter which constructs the receiver in accordance with Embodiment 1 of the present invention.
Figure 2:
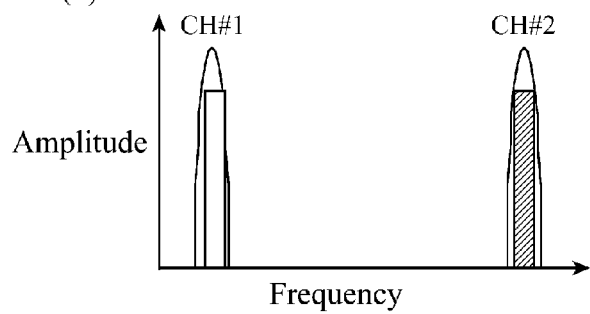

The band separation filter 14 allows the broadcast waves of the plurality of channels which the receiver desires to receive to pass therethrough simultaneously, and blocks passage of the other broadcast waves. For example, when desiring to receive all the broadcast waves including from the broadcast wave having the highest frequency to the broadcast wave having the lowest frequency, the band separation filter 14 has only to form a low pass filter whose pass band includes up to the frequency of the broadcast wave having the highest frequency, as expressed by its frequency characteristic as shown in FIG. 2(a), for example. As an alternative, when receiving only a lower end and an upper end of the entire broadcast wave band which the receiver desires to receive, the band separation filter has only to form a band pass filter whose pass band includes only these two frequencies (CH#1 and CH#2), as expressed by its frequency characteristic as shown in FIG. 2(b).

Figure 3:
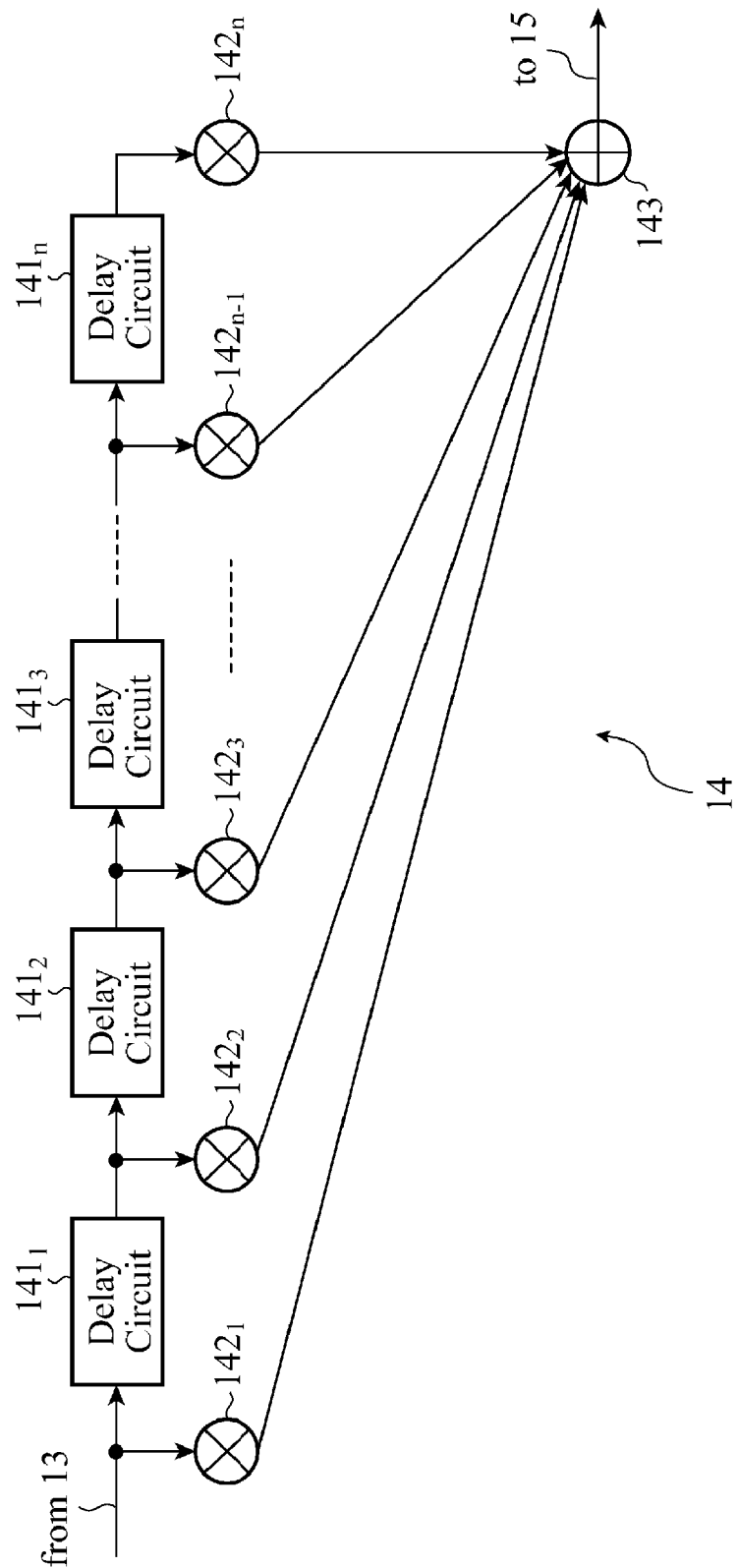
FIG. 3 is a view showing an equivalent circuit of the band separation filter which constructs the receiver in accordance with Embodiment 1 of the present invention.

An equivalent circuit of the band separation filter 14 is shown in FIG. 3. As shown in FIG. 3, the band separation filter 14 is comprised of an FIR (Finite Impulse Response) type transversal filter consisting of multistage delay circuits $141_1$ to $141_n$, coefficient multiplying units $142_1$ to $142_n$, and an adder 143. As well known, the delay circuits $141_1$ to $141_n$ delay the received signal by a predetermined time, each of the coefficient multiplying units $142_1$ to $142_n$ multiplies an input or output of a corresponding one of the delay circuits $141_1$ to $141_n$ by a predetermined coefficient, and the adder 143 calculates the sum of the outputs of the coefficient multiplying units $142_1$ to $142_n$.

The delay time provided by the delay circuits $141_1$ to $141_n$ determines the loopback characteristic of the FIR type transversal filter which constructs the band separation filter 14. More specifically, a filter characteristic repeats at frequency intervals each having a frequency equal to the reciprocal of a minimum of the delay time provided by the delay circuits $141_1$ to $141_n$. Hereafter, it is assumed that band control is carries out by using this loopback characteristic.

Referring to FIG. 1 again, the received radio waves which are limited only to the plurality of broadcast waves which the receiver desires to receive by the band separation filter 14 are outputted to the second frequency changing circuit 15, and a VCO #2 which constructs the second frequency changing circuit converts the received signal into a signal having an intermediate frequency which can be sampled at a proper sampling frequency at which the plurality of broadcast waves do not interfere with one another, and the intermediate frequency signal is outputted to the OFDM demodulator 16.

After performing frequency-axis conversion on the frequency band about the entire broadcast wave band which the receiver desires to receive by using an identical FFT (Fast Fourier Transform) unit, the OFDM demodulator 16 decomposes the intermediate frequency signal into the plurality of broadcast waves, and then converts each broadcast wave into an MPEG2-TS (Moving Picture Element Group 2-Transport Stream) and outputs this MPEG2-TS to a playback system including a not-shown decoding circuit.

Figure 4:
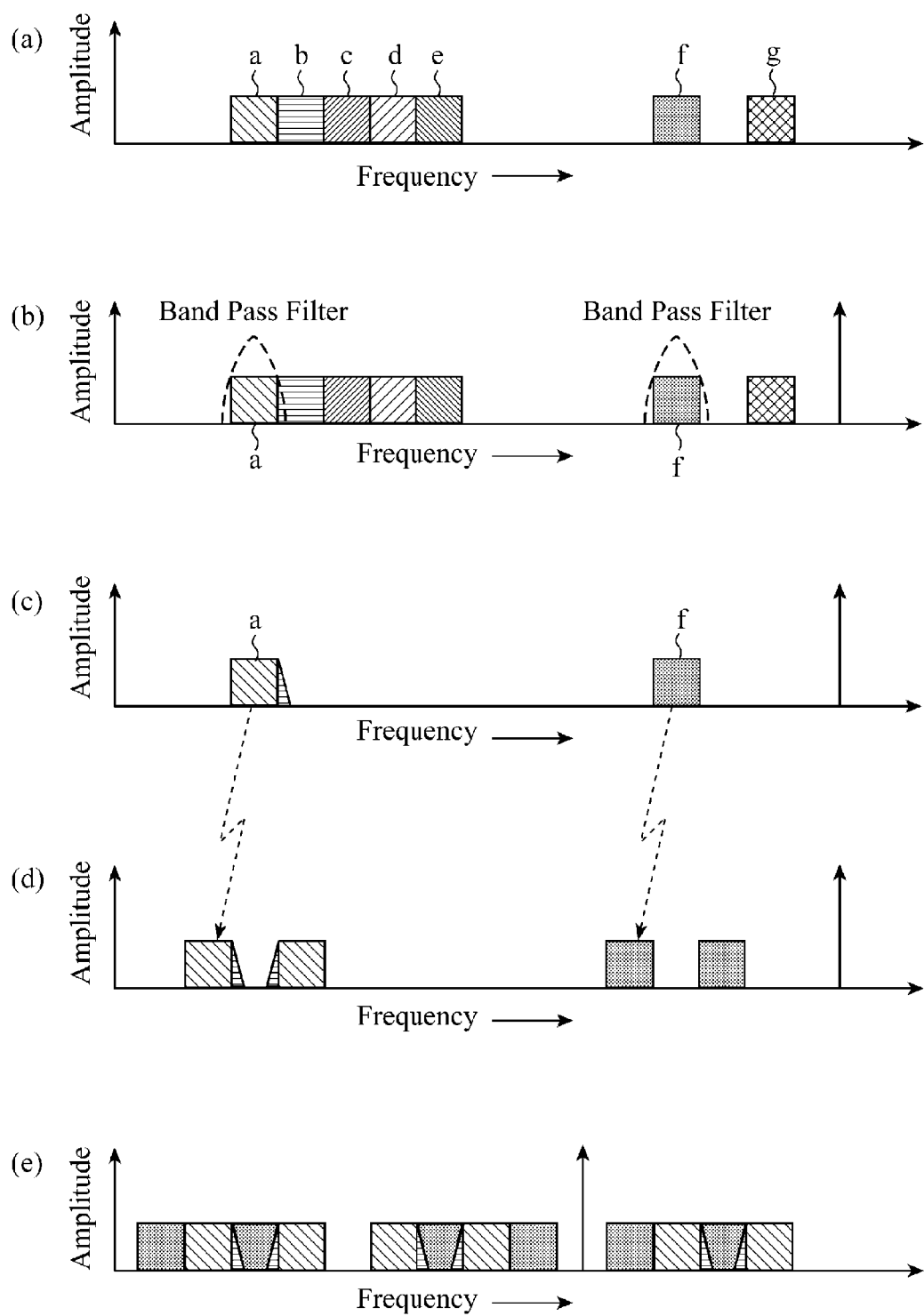
FIG. 4 is an operation conceptual diagram showing the operation of the receiver in accordance with Embodiment 1 of the present invention on the frequency characteristic view.

FIG. 4 is a view showing the frequency conversion carried out by the receiver in accordance with Embodiment 1 of the present invention, and FIG. 4(a) shows the output of the BPF 12, FIG. 4(b) shows the output of the first frequency changing circuit 13, FIG. 4(c) shows the output of the band separation filter 14, FIG. 4(d) shows the output of the second frequency changing circuit 15, and FIG. 4(e) shows the output of an A/D converter which is a front stage constructing the OFDM demodulator 16.

Hereafter, the operation of the above-mentioned receiver 1 will be explained with reference to FIG. 4. First, the received signal inputted to the antenna 11 is furnished to the BPF 12, and is limited to broadcast waves in the entire broadcast wave band by the BPF 12. Hereafter, it is assumed that seven broadcast waves a to g are extracted, as shown in FIG. 4(a).

Then, the first frequency changing circuit 13 can convert the received signal into a signal having a proper intermediate frequency signal including all the broadcast waves which the receiver desires to receive by setting the local oscillating frequency fx of the VCO #1 to ½(f1+f2+fy), where the frequency of the highest frequency one of the broadcast waves is f1, the frequency of the lowest frequency one of the broadcast waves is f2 and the offset frequency is fy.

The received radio waves whose frequencies have been converted into intermediate frequencies by the first frequency changing circuit 13 are inputted to the band separation filter 14, and, as shown in FIG. 4(b), when the band separation filter 14 limits its pass band in such a way that, for example, the two broadcast waves a and f, which the receiver desires to receive via multiple channels, can pass therethrough simultaneously to block the passage of the other broadcast waves, the frequency characteristic varies as shown in FIG. 4(c).

The received signal which is band-limited into the two broadcast waves by the band separation filter 14 is furnished to the second frequency changing circuit 15 and is subjected to further frequency conversion by the second frequency changing circuit 15, so that a frequency characteristic as shown in FIG. 4(d) is acquired. When the received signal is then sampled by the A/D converter which is an input stage constructing the OFDM demodulator 16, a frequency characteristic as shown in FIG. 4(e) is acquired.

The OFDM demodulator 16 separates the two broadcast waves which the receiver desires to receive via multiple channels from this received signal. Assuming that the OFDM demodulator extracts the one having a lower frequency of the two broadcast waves first, the local oscillating frequency of the VCO #2 of the second frequency changing circuit 15 needs to be selected in such a way that looped-back waves do not coincide their original waves after the A/D converter and the sampling frequency can be lowered, as shown in FIGS. 4(d) and 4(e).

Because the receiver 1 in accordance with above-mentioned Embodiment 1 is comprised of the first frequency changing circuit 13 for converting a received signal including two or more broadcast waves into a first intermediate frequency signal with a local oscillation, the band separation filter 14 for allowing bands included in the two or more broadcast waves converted into the above-mentioned first intermediate frequency signal to pass therethrough simultaneously, and the second frequency changing circuit 15 for converting the received signal which is outputted by the band separation filter 14 and which is limited to the two or more broadcast waves into a second intermediate frequency signal from which each of the broadcast waves can be sampled at a frequency at which the broadcast waves do not interfere with one another, the structural components including the OFDM demodulator 16 of the receiver can be shared while the broadcast waves of two or more channels can be received simultaneously. Therefore, the hardware amount can be reduced.

Furthermore, in the receiver in accordance with Embodiment 1, the band separation filter 14 is constructed of the FIR type transversal filter comprised of the multistage delay circuits 141₁ to 141ₙ for delaying the received signal by a predetermined time, the coefficient multiplying units 142₁ to 142ₙ each for multiplying the input or output of a corresponding one of the delay circuits 141₁ to 141ₙ by a predetermined coefficient, and the adder 143 for calculating the sum of the outputs of the coefficient multiplying units 142₁ to 142ₙ. Therefore, the receiver in accordance with Embodiment 1 can easily control the filter characteristic by using the loopback characteristic which the delay circuits 141₁ to 141ₙ have. Furthermore, because the delay circuits 141₁ to 141ₙ, the coefficient multiplying units 142₁ to 142ₙ and the adder 143 which construct the band separation filter 14 can be easily implemented by analog circuits, the band separation filter can be easily formed into an LSI circuit.

Because the receiver can easily carry out demodulation and reproduction of a plurality of broadcast waves by using the single OFDM demodulator 16, the receiver makes it possible to carry out multichannel reception with a small component count, and can implement further downsizing and cost reduction thereof.

In addition, in the receiver in accordance with above-mentioned Embodiment 1, the first frequency changing circuit 13 can convert the received signal into a signal having an intermediate frequency while preventing the plurality of broadcast waves from interfering with one another by setting the local oscillating frequency to ½(f1+f2+fy), where a first broadcast wave has a frequency of f1, a second broadcast wave has a frequency of f2 and the offset frequency is expressed as fy.

Embodiment 2

A receiver 1 in accordance with Embodiment 2, which will be explained hereafter, has the same structure as that in accordance with Embodiment 1 shown in FIG. 1. Therefore, the explanation of the structure of the receiver 1 in accordance with Embodiment 2 will be omitted to avoid a duplicated explanation. The receiver 1 in accordance with Embodiment 2 differs from that in accordance with Embodiment 1 in that an offset frequency fy is set to be equal to an integral multiple (n times) of the channel band fch of broadcast waves when an oscillating frequency fx provided to a VCO #1 of a first frequency changing circuit 13 is given by fx=½(f1+f2+fy). That is, fx is set to ½(f1+f2+fch×n).

The receiver in accordance with above-mentioned Embodiment 2 can set up an appropriate guard band (an available frequency region between adjacent channels) also at an intermediate frequency by setting the offset frequency fy to be equal to an integral multiple of the channel band fch of broadcast waves, the receiver can reduce the influence of neighboring interference to a minimum.

Embodiment 3

Figure 5:
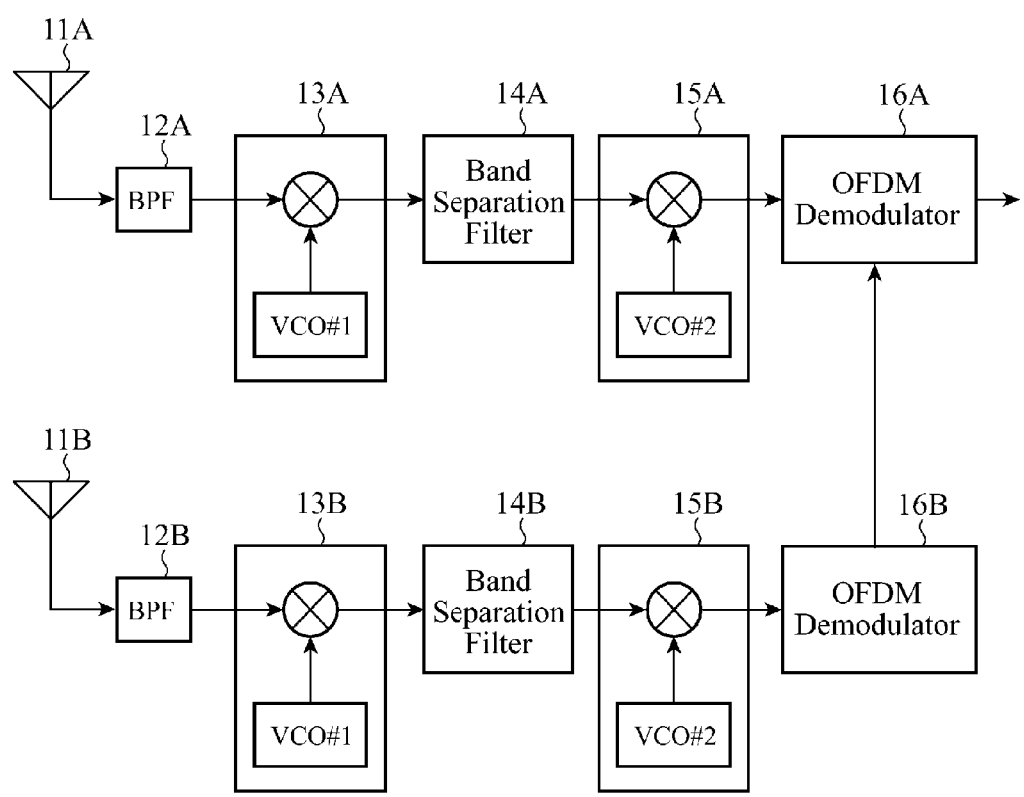
FIG. 5 is a block diagram showing the structure of a receiver in accordance with Embodiment 5 of the present invention.

FIG. 5 is a block diagram showing the structure of a receiver in accordance with Embodiment 3 of the present invention, and shows an n-branch diversity receiver for combining two or more radio waves which the diversity receiver desires to receive or switching between them to take measures against fading by using n receivers 1 (n is a positive integer) each of which is comprised of an antenna 11, a BPF 12, a first frequency changing circuit 13, a band separation filter 14, a second frequency changing circuit 15, and an OFDM demodulator circuit 16, which are shown in FIG. 1.

In this embodiment, the diversity receiver has two receivers: a receiver 1A comprised of an antenna 11A, a BPF 12A, a first frequency changing circuit 13A, a band separation filter 14A, a second frequency changing circuit 15A and an OFDM demodulator 16A, and a receiver 1B comprised of an antenna 11B, a BPF 12B, a first frequency changing circuit 13B, a band separation filter 14B, a second frequency changing circuit 15B and an OFDM demodulator 16B, and the OFDM demodulator 16A captures the output of the OFDM demodulator 16B to combine the output thereof with the output of the OFDM demodulator 16B or switches between the output thereof and the output of the OFDM demodulator 16B to carry out the above-mentioned diversity reception.

The receiver in accordance with above-mentioned Embodiment 3 has an n (n is an arbitrary positive integer) receiving systems each comprised of the first frequency changing circuit 13, the band separation filter 14, and the second frequency changing circuit 15, and carries out n-branch diversity reception to combine or switch between two or more radio waves which the diversity receiver is going to receive. Therefore, the receiver can implement multichannel reception while maintaining the diversity effect of taking measures against fading.

Industrial Applicability

Because the receiver in accordance with the present invention makes it possible to carry out multichannel reception and can implement further downsizing and cost reduction thereof, the receiver in accordance with the present invention is suitable for use as a receiver capable of receiving multiple channels which simultaneously receives two or more broadcast waves which the receiver desires to receive, and so on.

The invention claimed is:

1. A receiver comprising:
   a first frequency changing circuit for converting a received signal including two or more broadcast waves into a first intermediate frequency signal with a local oscillation;
   a band separation filter for allowing bands included in said two or more broadcast waves converted into said first intemiediate frequency signal to pass therethrough simultaneously; and
   a second frequency changing circuit for converting the received signal which is outputted by said band separation filter and which is limited to said two or more broadcast waves into a second intermediate frequency signal from which each of the broadcast waves can be sampled at a frequency at which the broadcast waves do not interfere with one another,
   wherein said band separation filter is comprised of multiple delay circuits for delaying said received signal by a predetermined time, coefficient multiplying units each for multiplying an input or an output of a corresponding one of said delay circuits by a predetermined coefficient, and an adder for calculating a sum of outputs of said coefficient multiplying units.

2. The receiver according to claim 1, wherein when a first broadcast wave of said two or more broadcast waves has a frequency of f1, a second broadcast wave of said two or more broadcast waves has a frequency of f2 (f1>f2), an offset frequency is expressed as fy, and said local oscillation has a frequency of α, said first frequency changing circuit generates said first intermediate frequency signal while satisfying: fx=½(f1+f2+fy).

3. The receiver according to claim 2, wherein said offset frequency fy is an integral multiple of a channel band which said two or more broadcast waves have.

4. The receiver according to claim 1, wherein said receiver has n receiving units (n is an arbitrary positive integer) each comprised of said first frequency changing circuit, said band separation filter, and said second frequency changing circuit, and carries out n branch diversity reception.

* * * * *